United States Patent
Pulini et al.

(10) Patent No.: US 8,520,588 B2
(45) Date of Patent: Aug. 27, 2013

(54) WIRELESS SYSTEM GATEWAY CACHE

(75) Inventors: Christopher F. Pulini, Conshohocken, PA (US); Alexander Chernoguzov, Warrington, PA (US)

(73) Assignee: Honeywell International Inc., Morristown, NJ (US)

( * ) Notice: Subject to any disclaimer, the term of this patent is extended or adjusted under 35 U.S.C. 154(b) by 1106 days.

(21) Appl. No.: 12/024,702

(22) Filed: Feb. 1, 2008

(65) Prior Publication Data
US 2009/0196218 A1 Aug. 6, 2009

(51) Int. Cl.
*H04W 4/00* (2009.01)

(52) U.S. Cl.
USPC ........................................... 370/328

(58) Field of Classification Search
USPC .......................................... 370/328
See application file for complete search history.

(56) References Cited

U.S. PATENT DOCUMENTS

| | | | |
|---|---|---|---|
| 6,891,838 B1 | 5/2005 | Petite et al. | |
| 7,103,018 B1* | 9/2006 | Hansen et al. | 370/328 |
| 7,295,128 B2 | 11/2007 | Petite | |
| 2004/0030762 A1* | 2/2004 | Silverthorne et al. | 709/223 |
| 2005/0141500 A1* | 6/2005 | Bhandari et al. | 370/389 |
| 2006/0077917 A1* | 4/2006 | Brahmajosyula et al. | 370/310 |
| 2007/0090945 A1* | 4/2007 | Hoogenboom | 340/539.1 |

OTHER PUBLICATIONS

Kemal Akkaya et al., "A survey on routing protocols for wireless sensor networks", Ad Hoc Networks, www.ElsevierComputerScience.com, 2003, 25 pages, see esp. sec. 2.9, Jul. 2003.

* cited by examiner

*Primary Examiner* — Raj Jain (57) ABSTRACT

A wireless system gateway cache is presented. The gateway includes a first, wireless interface, a second interface, and a cache controller. The cache controller receives a characteristic of a parameter of a first device. The cache controller also receives a value of the parameter from the first device via the first interface and stores the value according to the characteristic of the parameter. The cache controller further receives a request for the value of the parameter from a second device via the second interface and sends the stored value to the second device in response to the request.

20 Claims, 5 Drawing Sheets

WIRELESS SYSTEM GATEWAY CACHE

TECHNICAL FIELD

This disclosure relates generally to wireless communication and more specifically to a wireless system gateway cache.

BACKGROUND

A process plant is a complex, multifaceted entity, a structured organization of physical elements, operated for economic and other criteria that are often industry-specific. A process plant has a number of different stakeholders who can affect and/or are affected by its operation. Critical to the operation of many process plants today is a process control system, which ensures that appropriate parameters are measured and actions taken, plant personnel are kept informed, abnormal situations are identified and addressed, and business processes are integrated. Automation, monitoring, and control systems are employed in diverse applications, such as residential, shipping, warehousing, refining and petrochemical plants, the petroleum and natural gas supply chain, pulp and paper manufacturing, electrical power generation, chemical production, food production, wastewater treatment, discrete product manufacturing, cable-laying ships, tunnel ventilation control, and mining operations.

In many automation, monitoring, and control applications the cost of running wires from nodes such as sensors, actuators and user interfaces to an analysis system limits the number and location of such nodes initially deployed. Cost and difficulty of wiring installation may also limit the deployment of additional nodes in an already-functioning system. The recent development of wireless communication technologies, such as Bluetooth, IEEE® 802.11, RFID and others, promises a solution to such wiring costs, but not without introducing new challenges to the reliability and security of automation, monitoring, and control systems.

Some devices (or nodes) in a wireless communication system are powered by batteries and it is desirable for such devices to have a predictable, extended battery life. A predictable battery life allows system operators to coordinate battery replacement maintenance for a group of nodes. An extended battery life enables less frequent battery replacement.

SUMMARY

This disclosure provides a wireless gateway system cache.

In a first embodiment, a method includes receiving in a gateway a characteristic of a parameter of a first device in wireless communication with the gateway. The method also includes storing in the gateway a value of the parameter according to the characteristic of the parameter. The method further includes receiving a request for the value of the parameter from a second device and sending the stored value to the second device in response to the request.

In a second embodiment, a device includes a first, wireless interface, a second interface, and a cache controller. The cache controller is operable to receive a characteristic of a parameter of a first device. The cache controller is also operable to receive a value of the parameter from the first device via the first interface and store the value according to the characteristic of the parameter. The cache controller is further operable to receive a request for the value of the parameter from a second device via the second interface and send the stored value to the second device in response to the request.

In a third embodiment, a system includes first and second devices and a gateway. The first device includes a parameter that has a characteristic. The second device is operable to send a request for a value of the parameter. The gateway includes a first, wireless interface, a second interface, and a cache controller. The cache controller is operable to receive the characteristic of the parameter of a first device. The cache controller is also operable to receive a value of the parameter from the first device via the first interface and store the value according to the characteristic of the parameter. The cache controller is further operable to receive a request for the value of the parameter from a second device via the second interface and send the stored value to the second device in response to the request.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
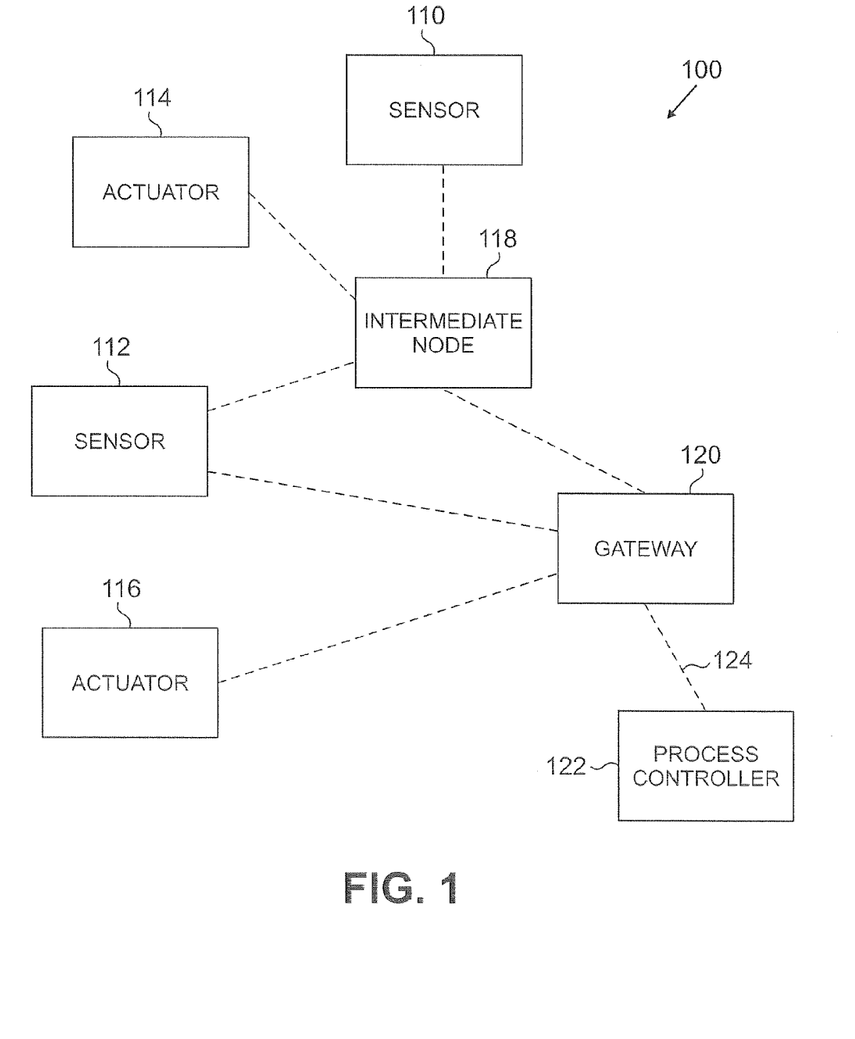
FIG. 1 illustrates an example wireless automation, monitoring, and control system according to an embodiment of this disclosure.

FIG. 1 illustrates an example wireless automation, monitoring, and control system 100 according to one embodiment of this disclosure. The embodiment of the system 100 shown in FIG. 1 is for illustration only. Other embodiments of the system 100 could be used without departing from the scope of this disclosure.

In this example embodiment, the wireless system 100 is depicted as a process control application. In other embodiments, however, the system 100 may be used in any suitable type of automation, monitoring or control application. For example, the wireless system 100 could be used in a building, an industrial facility or an urban environment. Although the wireless sensor system 100 may be described below as being used in an industrial facility, the system 100 could be used in any of these or other environments.

In addition, the wireless system 100 could use any suitable wireless signals to communicate. Although the system 100 may be described below as using radio frequency (RF) signals to communicate, the wireless system 100 could use any other or additional type of wireless signal.

As shown in FIG. 1, the wireless security sensor system 100 includes a process controller 122 coupled by a communication link 124 to a wireless gateway 120. The wireless gateway 120 may be in wireless communication with an intermediate node 118 and wireless devices 112 and 116. The intermediate node 118 may, in turn, communicate wirelessly with wireless devices 110, 112 and 114 and relay signals between the gateway 120 and the wireless devices 110, 112 and 114. While only a single control device, the process controller 122, is shown coupled to the wireless gateway 120, it will be understood that additional devices may also be coupled to the wireless gateway 120, such as status monitoring devices and devices for storing archival records of system behavior.

The wireless devices 110 and 112 are sensors, which measure one or more physical characteristics of a process under control and wirelessly send the measured values to the process controller 122. The wireless devices 114 and 116 are actuators, such as solenoids or valves, which perform one or more actions affecting the process under control upon commands received wirelessly from the process controller 122. The wireless devices 110, 112, 114 and 116 are also referred to as 'leaf nodes.'

Items of information that can be sent to a wireless device to configure it or control its actions, and items of information that can be read from the device regarding its configuration, status and operational environment, are referred to as 'parameters.' Information about parameters may be expressed in a format defined in the Wireless Network for Secure Industrial Applications (WNSIA) standard. The WNSIA standard defines objects that are used in a communications stack. The objects may represent wireless devices. WNSIA objects are used in a User layer that sits on top of Application Interface layer, which in turn sits on top of a complete network communication stack that includes Security, Network, and Physical layers.

Parameters supported by all wireless devices and described in the WNSIA standard are referred to as 'standard' parameters. Descriptor information for standard parameters may be stored in firmware in the wireless gateway 120. Parameters defined for a particular vendor and/or particular product are referred to as 'vendor-specific' parameters. When a new wireless device is added to the system 100, descriptor information for vendor-specific parameters may be loaded to the gateway 120 from the device itself. Alternatively, vendor-specific parameters may be loaded to the gateway 120 from the process controller 122 or other monitoring and control device, which receives the parameter from a device descriptor file provided by the device manufacturer.

Figure 2:
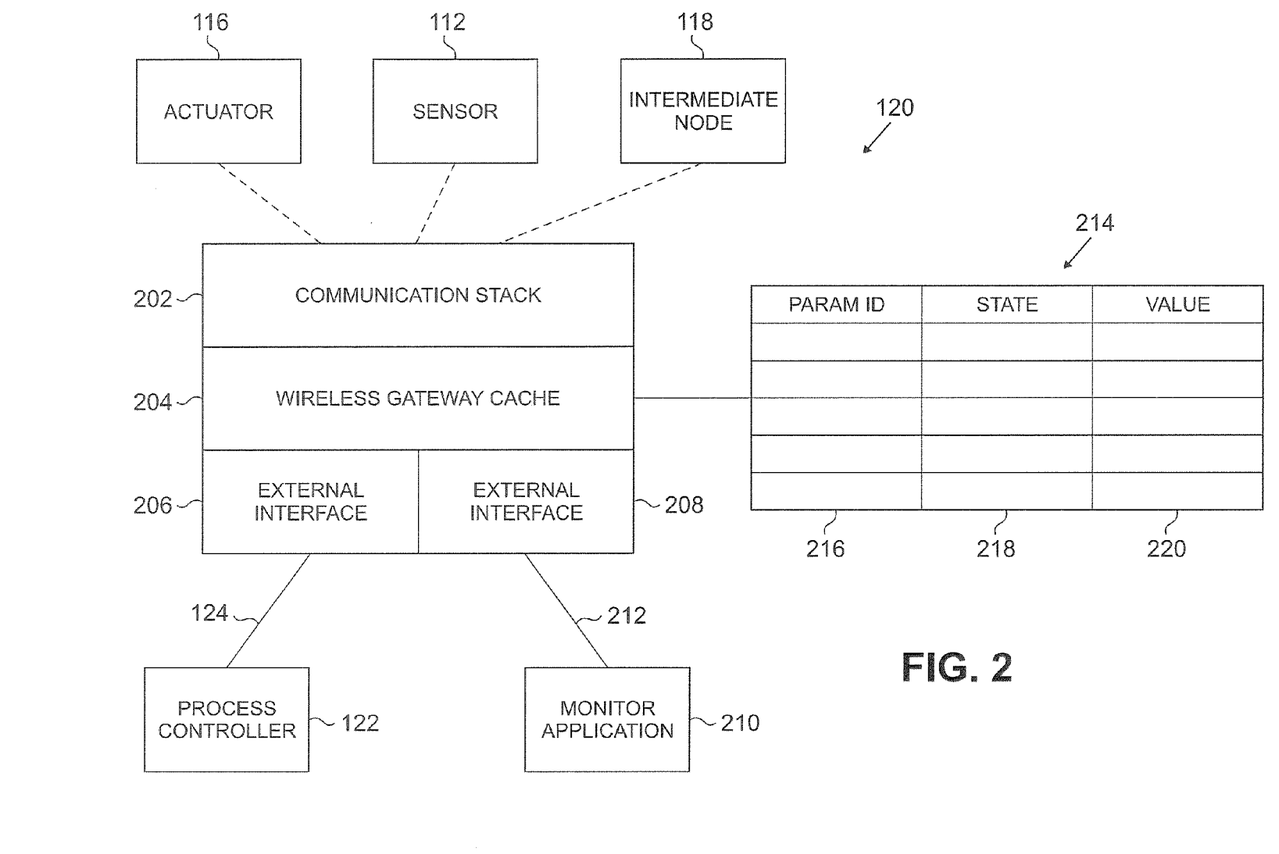
FIG. 2 illustrates an example wireless gateway system cache according to an embodiment of this disclosure.

FIG. 2 illustrates the example wireless gateway 120 of FIG. 1 in more detail. The gateway 120 includes a communication stack 202, which complies with the WNSIA standard. In other embodiments, the stack 202 may comply with other wireless communication standards.

The WNSIA communication stack 202 handles communication via a wireless interface between the gateway 120 and wireless devices (or nodes) 110, 112, 114 and 116. The communication stack is used to process request, response, indication, confirmation and other primitive calls for the following services:

Publish—where a wireless device publishes single or multiple parameter data values to automation, monitoring, or control applications;

Read—where an automation, monitoring, or control application read single parameter data values from a wireless device;

Write—where an automation, monitoring, or control application writes a specified value to a single parameter to a wireless device;

Event—where a wireless device indicates an alarm or other event has occurred in the node; and Remote Procedure Call (RPC)—where an automation, monitoring, or control application executes a remote procedure call on a specified wireless device.

The gateway 120 also includes external interfaces 206 and 208. The external interface 206 provides communication over the link 124 to the process controller 122. The external interface 208 provides communication over a link 212 to a monitor application 210.

While the gateway 120 is depicted with two external interfaces, it will be understood that in other embodiments the gateway 120 may include additional external interfaces. Furthermore, additional or alternate automation, monitoring, and/or control applications may communicate with the gateway 120 via such external interfaces. Depending upon communication requirements of an automation, monitoring, or control application, the external interfaces 206 and 208 may implement the Modbus, TCP/IP, OPC, HART, HTTP or other communication protocol.

The gateway 120 also includes a wireless gateway cache 204. Without the cache 204, any write or read of wireless node information by the process controller 122 or the monitor application 210 results in a corresponding wireless communication to/from the wireless node. Each such wireless communication uses bandwidth of the wireless network and reduces battery life in battery powered leaf nodes and intermediate nodes.

The cache 204 reduces wireless communication traffic by maintaining a local copy of some of the parameters written to, or read from, the wireless nodes. Specifically, the cache 204 maintains a cached parameter list 214 for parameters recently requested by the external interfaces. Information stored in the cache parameter list 214 for each parameter in the list includes a parameter identifier, 216, a parameter state 218, and a parameter value 220.

Requests from both the external interfaces 206 and 208 are handled by the wireless gateway cache 204. The external interfaces 206 and 208 do not directly interface with the communication stack 202. A single instance of any individual parameter exists within the cache 204. If multiple external interfaces issue requests for the same parameter in the cache 204, all requests will be handled by the single instance within the cache 204. For example, a requests from the external interface 206 will use the same parameter data as a request from the external interface 208.

The wireless gateway cache 204 allows multiple external interfaces to operate using a single resource for parameter data. The number of external interfaces issuing requests for an individual parameter will not increase the number of data transmissions over the wireless sensor network. The wireless gateway cache 204 handles any number of external interfaces while minimizing data transmission over the wireless network.

In this way, data transmissions over the wireless network are limited and predictable. Predictable data transmissions may result in predictable power consumption. Wireless devices may therefore have a predictable, extended battery life. A predictable battery life may allow users to coordinate battery replacement maintenance across a group of nodes. An extended battery life may allow users to go longer without needing to perform battery replacement maintenance.

A parameter may be added to the cached parameter list 214 upon a first access from an external interface or a first publication of data by a wireless device. A parameter will remain in the list 214 while an external interface continues to access its value with a read, write or other command. A parameter may be removed from the list 214 after a period of inactivity from external interfaces.

When a parameter is added to the cached parameter list 214, certain behavior is common to all parameters:

If a parameter read is requested through the external interface 206 or 208, the cache 204 forwards a read request to the communication stack 202.

If a parameter write is requested through the external interface 206 or 208, the cache 204 forwards a write request with the specified value to the communication stack 202. Upon confirmation of the write, the cache 204 forwards a read request to the communication stack 202. Read after write behavior attempts to ensure that the value 220 in the list 214 matches the value in the wireless device after a write.

If a first received publication of data by a wireless node is forwarded to the cache 204 from the communication stack 202, the specified value 220 is added to the list 214. No read call by the gateway 120 is required for published parameter data.

A parameter is classified in its descriptor information as dynamic, static, constant, or uncached/volatile.

Dynamic parameters represent frequently changing data. The gateway 120 periodically updates dynamic parameter data while the parameter remains on the cached parameter list. The gateway 120 periodically refreshes non-published dynamic parameter data at 15 second intervals. The gateway 120 issues a read request for non-published dynamic parameter data updates. The gateway 120 periodically refreshes published dynamic data as it receives publications via the communication stack 202. The gateway 120 does not use a read request for published dynamic parameter updates.

The gateway 120 removes a non-published dynamic parameter from the cached parameter list after 30 seconds of inactivity. If no external interface requests the parameter for 30 seconds, the gateway 120 removes the parameter from the cached parameter list. The gateway 120 does not remove a published dynamic parameter from the cached parameter list as long as publications are received via the communication stack 202. The gateway 120 also removes a dynamic parameter from the cached parameter list if the associated wireless device is removed from the wireless network 100.

Examples of dynamic parameters include primary variable, cold junction temperature, and battery voltage.

Static parameters represent infrequently changing behavior. A wireless device indicates a change in at least one of its static parameters using a standard parameter ST_REV. The wireless device increments a current value of ST_REV when any static parameter value within the device is updated.

The gateway 120 updates static parameter data for a wireless device when a change in the value of ST_REV for the device indicates a new revision of static parameter value is available and the parameter remains on the cached parameter list. Static parameter data is not refreshed periodically.

The gateway 120 removes a static parameter from the cached parameter list after 30 minutes of inactivity. If no external interface requests the parameter for 30 minutes, the gateway 120 removes the parameter from the cached parameter list and the parameter data is deleted from memory. The gateway 120 also removes a static parameter from the cached parameter list if the associated wireless device is removed from the wireless network 100.

Examples of static parameters include mode, device tag, units, and scale configuration.

The gateway 120 handles the ST_REV parameter similarly to a dynamic parameter, however, the following differences apply:

The gateway 120 automatically adds and removes ST_REV from the cached parameter list. When static parameters exist in the cached parameter list, the gateway 120 monitors ST_REV.

The gateway 120 periodically updates ST_REV every 45 seconds.

Constant parameters represent constant, or unchanging, data. The gateway 120 does not update constant parameter data. After a first time read, a constant parameter remains in the cache 204 for the lifetime of the parameter. A constant parameter is not removed from the cached parameter list unless the device is removed from the wireless sensor network.

The uncached/volatile classification is used for a parameter representing data that cannot be cached. Any parameter data that is volatile is given the uncached classification. A read operation on an uncached parameter results in a read operation via the communication stack 202.

One example of an uncached parameter is a parameter used for firmware upload or firmware download. Another example is a command/status or command/data parameter combination, where a write to one parameter causes data to change in a second parameter.

Figure 3:
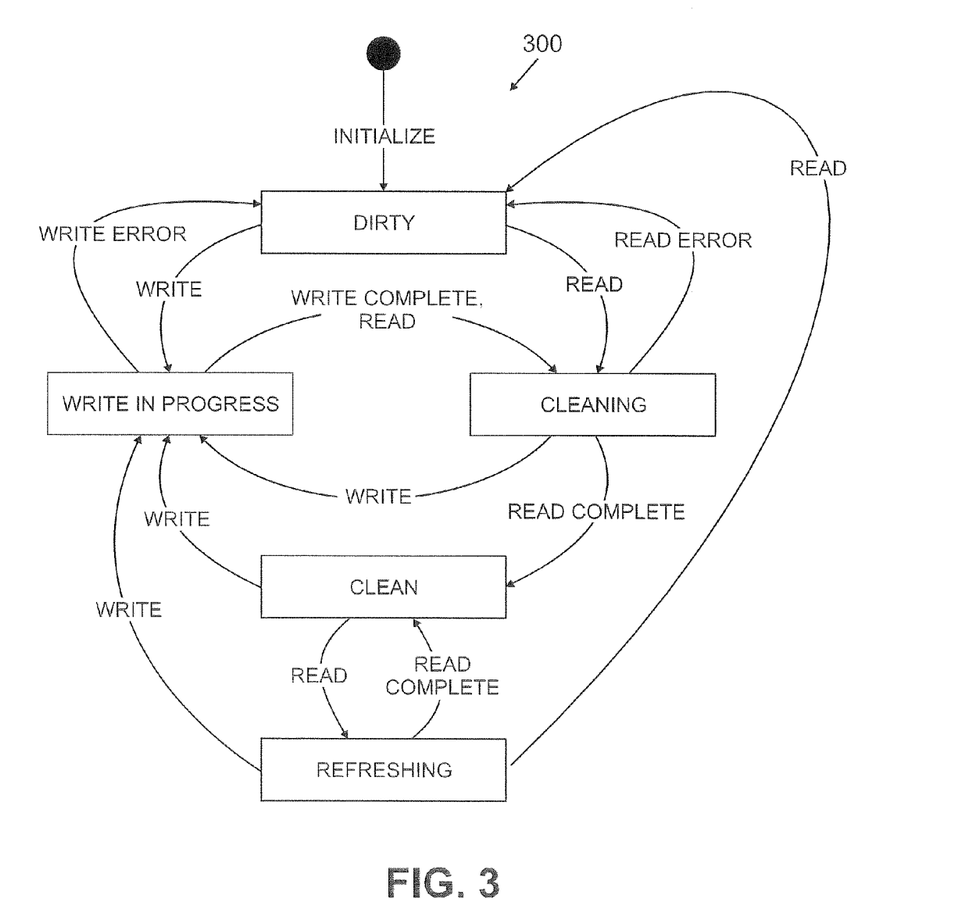
FIG. 3 presents a state diagram parameter states according to an embodiment of this disclosure.

Parameter data is maintained in the cache for all parameters in the cached parameter list 214. The state 218 for a parameter in the list 214 has one of five values: clean, refreshing, cleaning, dirty, or write in progress. FIG. 3 presents a state diagram 300 for the parameter states of the cache 204. Parameter data in the clean and refreshing states is considered valid. The cache 204 responds to a read request from the external interface 206 or 208 using the value 220 of this parameter data in the list 214. Parameter data in the cleaning, dirty, and write in progress states is considered invalid. The cache 204 does not respond to a read request from the external interface 206 or 208 using the current value 220 of this parameter data in the list 214.

If the parameter state 218 is clean, no outstanding request exists for the parameter data. The cache 204 responds to an external interface request with the current value 220. If the parameter state 218 is refreshing, the cache 204 has an outstanding read request for the parameter data and the value 220 in the cache 204 was previously clean. This state indicates that a periodic cache update is occurring. The cache 204 responds to an external interface request with the current value 220.

If the parameter state 218 is cleaning, the cache 204 has an outstanding read request for the parameter data and the value 220 in the cache 204 was previously dirty. This state value indicates that a first time read or a read-after-write is occurring. The cache 204 cannot respond to an external interface request using the current value 220. The cache 204 either immediately responds to the request with a pending warning or waits for the parameter data read to complete before returning the updated value 220.

If the parameter state 218 is dirty, no outstanding request exists for the parameter data and the value 220 in the cache 204 is invalid. This state value may indicate that a read or write error has occurred. The cache cannot respond to an external interface request using the current value 220. Instead, the cache 204 issues an update request to the communication stack 202 and changes the parameter state 218 to cleaning.

If the parameter state 218 is write in progress, the cache 204 has an outstanding write request for the parameter data. The cache cannot respond to an external interface request using the current value 220. When the write completes, the cache 204 will issue an update request to the communication stack 202 and change the parameter state 218 to cleaning. The cache 204 either immediately responds to an external interface request with a pending warning or waits for the parameter data read-after-write to complete before returning the updated value 220.

Figure 4:
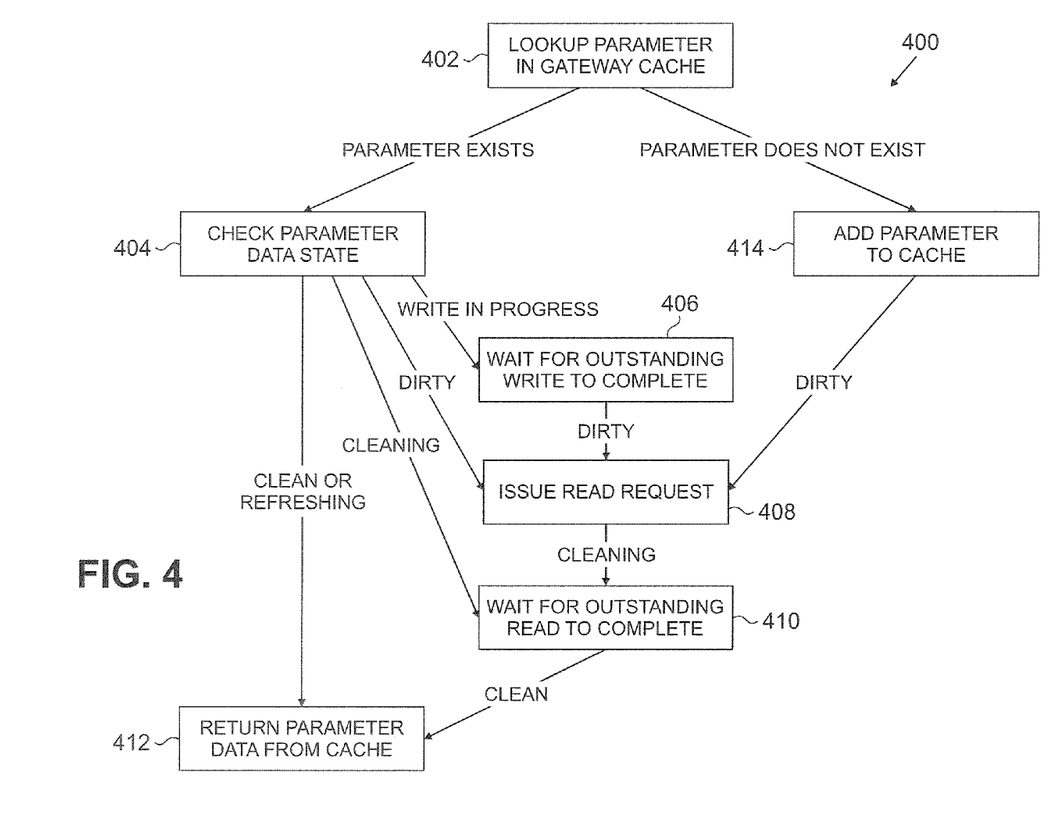
FIG. 4 presents a flow chart of a parameter read request according to an embodiment of this disclosure.

FIG. 4 presents a flow chart of a parameter read request procedure 400 according to an embodiment of this disclosure. Upon receipt of a parameter read request via the external interface 206 or 208, the procedure 400 determines in step 402 whether the requested parameter is in the cached parameter list 214 by comparing a parameter identifier received with the request to parameter identifiers 216 stored in the cached parameter list 214. If the parameter is in the cached parameter list 214, the procedure 400 determines in step 404 the state 218 of the parameter. If the state 218 is write in progress, the procedure 400 moves to step 406 to wait for an outstanding write request to complete.

When the outstanding write finishes, the procedure 400 changes the parameter state 218 to dirty and moves to step 408, where it issues a read request via the communication stack 202. The procedure 400 also moves to step 408 from step 404 if the state 218 determined in step 404 is dirty. Once the procedure 400 issues the read request in step 408, it sets the parameter state 218 to cleaning and moves to step 410, where it waits for the read request to complete. The procedure 400 also moves to step 410 from step 404 if the state 218 determined in step 404 is cleaning.

Once the read request completes, step 410 writes the received value into the value 220 changes the parameter state 218 to clean and the procedure 400 moves to step 412, where the procedure 400 returns the current value of the parameter in the cache 204 via the external interface 206 or 208. The procedure 400 also moves to step 412 if the state determined in step 404 is clean or refreshing.

If, in step 402, the procedure 400 determines that the requested parameter is not in the cached parameter list 214, the procedure 400 moves to step 414. In step 414, the procedure 400 adds the parameter to the cached parameter list 214, sets the parameter state 216 to dirty, and moves to step 408, where it issues a read request via the communication stack 202.

Figure 5:
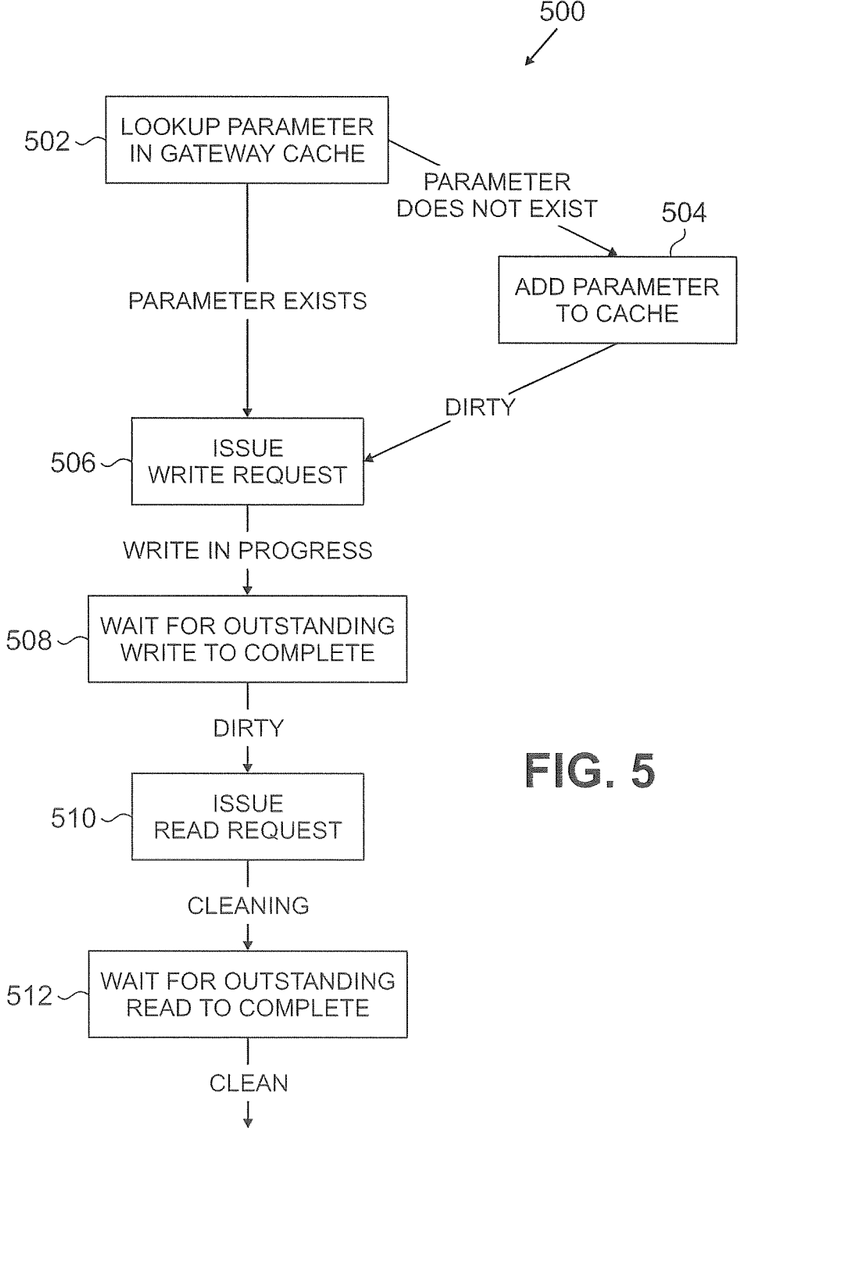
FIG. 5 presents a flow chart of a parameter write request according to an embodiment of this disclosure.

FIG. 5 presents a flow chart of a parameter write request procedure 500 according to an embodiment of this disclosure. Upon receipt of a parameter write request via the external interface 206 or 208, the procedure 500 determines in step 502 whether the requested parameter is in the cached parameter list 214 by comparing a parameter identifier received with the request to parameter identifiers 216 stored in the cached parameter list 214.

If the parameter is in the list 214, the procedure 500 moves to step 506. If the parameter is not in the cached parameter list 214, the procedure 500 moves to step 504, where it adds the parameter to the list 214, sets the parameter state 218 to dirty and moves to step 506.

In step 506, the procedure 500 issues a write request via the communication stack 202, sets the state 218 to write in progress, and moves to step 508. In step 508, the procedure 500 waits for the outstanding write request to complete. Upon the completion of the write request, the procedure 500 sets the state 218 to dirty and moves to step 510. In step 510, the procedure 500 issues a read request via the communication stack 202, sets the state 218 to cleaning, and moves to step 512. In step 512, the procedure 500 waits for the outstanding read request to complete. Upon completion of the read request, the procedure 500 write the value just read into the value 220 and sets the state 218 to clean.

As an example of operation of the gateway 120, consider that the wireless device 112 includes three standard parameters: primary variable (PV) is a published dynamic parameter, MODE is a static parameter, and SERIALNUM is a constant parameter.

When the process controller 122, which is monitoring all three parameters, is connected via the external interface 206, the external interface 206 forwards a parameter request for one of the three parameters from the process controller 122 to the wireless gateway cache 204. If needed, the wireless gateway cache 204 adds the requested parameter to the cached parameter list 214.

PV is a published parameter and will already exist within the cached parameter list 214. The wireless gateway cache 204 can respond immediately to requests for PV.

MODE is a static parameter and may need to be added to the cached parameter list 214. If this is the first static parameter added to the cached parameter list 214, ST_REV will be automatically added. Read requests will be issued for MODE and ST_REV via the communication stack 202.

SERIALNUM is a constant parameter and may need to be added to the cached parameter list 214. A read request will be issued for SERIALNUM via the communication stack 202.

PV will be updated as publications are forwarded from the device 112 via the communication stack 202. MODE may be updated if ST_REV is incremented, because ST_REV may increment without the value of MODE changing. SERIALNUM will not be updated, since it is a constant parameter.

When the monitor application 210, which is monitoring the same three parameters, is connected through the external interface 208, the external interface 208 forwards a parameter request for one of the three parameters from the monitor application 210 to the wireless gateway cache 204. Since all parameters already exist in the wireless gateway cache 204, the cache will respond immediately to a request for any of PV, MODE, and SERIALNUM. As above, PV is updated as publications are forwarded from the device 112 via the communication stack 202, MODE may be updated if ST_REV is incremented, and SERIALNUM will not be updated.

In the event that both the process controller 122 and the monitor application 210 disconnect, no further requests are forwarded by the external interfaces 206 and 208 to the wireless gateway cache 204. PV will remain in the cache 204 while publications are forwarded from the device 112 via the communication stack 202. MODE will timeout in the cache 204 and will be removed from the cached parameter list 214. If MODE is the last static parameter to be removed from the cached parameter list, ST_REV will be automatically removed. SERIALNUM will remain in the cache 204 as a constant parameter.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "send," "transmit," "receive," and "communicate," as well as derivatives thereof, encompass both direct and indirect communication. The terms "include" and "comprise," as well as derivatives thereof, mean inclusion without limitation.

The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising:
   receiving in a gateway a classification of a parameter of a first device in wireless communication with the gateway, the classification being one of: dynamic, static, constant, and volatile;
   storing in the gateway a value of the parameter for an amount of time that is based on the classification of the parameter;
   receiving a request for the value of the parameter from a second device; and
   sending the stored value to the second device in response to the request.

2. The method of claim 1, wherein the sending of the stored value to the second device is performed only if a state of the parameter has a value associated with a valid parameter, wherein the value of the state of the parameter is one of: clean, refreshing, cleaning, dirty, or write in progress.

3. The method of claim 1, further comprising:
   sending a read command to the first device; and
   receiving the value of the parameter from the first device, wherein the value is received from the first device in response to the read command.

4. The method of claim 3, wherein the read command is sent repeatedly at a predetermined time interval according to the classification of the parameter.

5. The method of claim 3, further comprising receiving in the gateway a value of a second parameter of the first device, wherein the read command is sent in response to receiving the value of the second parameter.

6. The method of claim 3, further comprising:
   receiving a write value for the parameter from the second device; and
   sending a write command to the first device to set the parameter to the write value, wherein the read command is sent in response to completion of sending the write command.

7. The method of claim 1, further comprising removing the stored value of the parameter from the gateway after the amount of time elapses.

8. A device comprising:
   a first interface, wherein the first interface is a wireless interface;
   a second interface; and
   a cache controller operable to:
      receive a classification of a parameter of a first device, the classification being one of: dynamic, static, constant, and volatile;
      receive a value of the parameter from the first device via the first interface;
      store the value of the parameter for an amount of time that is based on the classification of the parameter;
      receive a request for the value of the parameter from a second device via the second interface; and
      send the stored value to the second device in response to the request.

9. The device of claim 8, wherein:
   the cache controller is operable to send a read command to the first device via the first interface; and
   the value of the parameter is received from the first device in response to the read command.

10. The device of claim 9, wherein the cache controller is operable to send the read command repeatedly at a predetermined time interval according to the classification of the parameter.

11. The device of claim 9, wherein:
    the cache controller is operable to receive a value of a second parameter from the first device; and
    the read command is sent in response to receiving the value of the second parameter.

12. The device of claim 9, wherein the cache controller is operable to:
    receive a write value for the parameter from the second device via the second interface;
    send a write command to the first device via the first interface to set the parameter to the write value; and
    send the read command in response to completion of sending the write command.

13. The device of claim 8, wherein the cache controller is operable to remove the stored value of the parameter after the amount of time elapses without receiving the request for the value of the parameter from the second device.

14. A system comprising:
    a first device associated with a parameter, wherein the parameter has a classification, the classification being one of: dynamic, static, constant, and volatile;
    a second device operable to send a request for a value of the parameter; and
    a gateway comprising:
       a first interface, wherein the first interface is a wireless interface;
       a second interface; and
       a cache controller operable to:
          receive the classification of the parameter of the first device;
          receive the value of the parameter from the first device via the wireless interface;
          store the value of the parameter for an amount of time that is based on the classification of the parameter;
          receive the request for the value of the parameter from the second device via the wireline interface; and
          send the stored value to the second device in response to the request.

15. The system of claim 14, wherein:
  the cache controller is operable to send a read command to the first device via the wireless interface; and
  the value of the parameter is received from the first device in response to the read command.

16. The system of claim 15, wherein the cache controller is operable to send the read command repeatedly at a predetemined time interval according to the classification of the parameter.

17. The system of claim 15, wherein:
  the cache controller is operable to receive a value of a second parameter from the first device; and
  the read command is sent in response to receiving the value of the second parameter.

18. The system of claim 15, wherein the cache controller is operable to:
  receive a write value for the parameter from the second device;
  send a write command to the first device via the wireless interface to set the parameter to the write value; and
  send the read command in response to completion of sending the write command.

19. The system of claim 14, wherein the cache controller is operable to remove the stored value of the parameter after the amount of time elapses without receiving the request for the value of the parameter from the second device.

20. The system of claim 14, wherein the cache controller is operable to:
  receive an indication that the first device has been removed from the system; and
  remove the stored value of the parameter in response to the indication.

* * * * *